United States Patent Office 2,717,829
Patented Sept. 13, 1955

2,717,829

ORE PREPARATION

Robert S. A. Dougherty, Bethlehem, Pa., assignor to Bethlehem Steel Company, a corporation of Pennsylvania No Drawing. Application October 17, 1950,
Serial No. 190,669

4 Claims. (Cl. 75—103)

This invention relates to the separation of metal values from iron ores, and more particularly to the separation of small quantities of nickel and/or cobalt from iron ore of the nickeliferous lateritic, or Mayari, type.

The principal object of this invention is to effect a satisfactory separation of nickel and/or cobalt from roasted iron ores, when such ores are leached with ammonium carbonate solution.

Another object is to recover ammonium carbonate leaching solution for re-use.

A further object is to obtain nickel and/or cobalt compounds in a form readily separated from solution.

Still another object is to recover iron in a form readily separated from aqueous nickel salt solutions.

It has long been known to leach ores with ammonium carbonate to separate metal values, such as nickel and cobalt, from other metal constituents, by treating under atmospheric conditions of temperature and pressure. The leaching method has been used with nickel ores to separate nickel from small amounts of iron, and likewise with iron ores to separate iron from small amounts of nickel, as well as cobalt if present. When it is desired to separate iron, present in iron ore as ferric oxide, from small amounts of nickel or cobalt by means of an ammonium carbonate leach, a reducing roast must precede the leaching step. During roasting, nickel and/or cobalt are reduced to the elemental metal and great care must be used to halt the reduction just short of the point at which metallic iron is formed. When the ore is over-reduced, i. e., when considerable metallic iron is present prior to leaching, considerable difficulty is encountered in separating the nickel from the precipitated iron compounds, possibly because of the large amount of gelatinous ferric hydroxide present. In refining a nickel-containing iron ore for use in the blast furnace, for example, it is mandatory that nickel be almost entirely removed from the ore. While, as has been pointed out, nickel may be satisfactorily removed from the ore by prior ammonium carbonate leaching methods, the close control required in roasting the ore previous to the leaching step involves a tedious procedure.

I have found that by reducing an ore of the nickeliferous lateritic type, which may or may not contain cobalt, to the point at which nickel and/or cobalt are reduced to the metallic state, satisfactory separation of the iron from the nickeliferous metal values is obtained without regard to the extent of reduction of the iron if the subsequent leach with ammonium carbonate is made at elevated pressure and temperature, and in the presence of ammonia gas. I have found my process to give excellent results when treating an ore of the Mayari type found in Cuba, in which nickel may be present in quantities of from 0.05–1.75%, and cobalt if present will range from 0.05–0.20%. Moreover, over-reduction of the ore does not have a deleterious effect on the separation by my process, separations having been made wherein up to 79% of the iron in the ore has been reduced to the metallic state. For purposes of this invention, when speaking of nickeliferous iron ore, I mean to include those iron ores which contain nickel, as well as those which contain both nickel and cobalt. The term "nickel values" as used herein applies to nickel, or nickel and cobalt, for cobalt, when present, is believed to act in the same manner as nickel. The reducing roast is performed in order to convert the nickel and cobalt compounds, present presumably as silicates or oxides, to a state in which they are amenable to the ammonium carbonate leaching treatment. When, after such a roast, nickel and cobalt are treated with ammonium carbonate solution, nickel ammonium carbonate complex and cobalt ammonium carbonate complex are formed. These complexes are soluble in an aqueous solution of ammonium carbonate under atmospheric conditions of temperature and pressure, and can thus be separated from the solid iron compounds. By my invention I can take a nickeliferous iron ore, which has been reduced to any state varying between that at which the nickeliferous values are just completely reduced to metal, while little or none of the iron has been reduced to metal, up to a state of substantially complete reduction of the ore, which for practical purposes may be said to be that point at which about 78–80% of the iron has been reduced to metallic iron, and leach said reduced ore with ammonium carbonate at elevated temperature and pressure by means of an autoclave and obtain satisfactory separation of iron from nickeliferous material.

While prior methods of leaching required, for satisfactory separation, a reduced ore having very little metallic iron, or one in which the iron was present as magnetite plus some wüstite, by my autoclaving treatment I not only can treat satisfactorily ore thus reduced, but also can obtain satisfactory separation of metal values with ore that has been reduced to any degree beyond that point, including the state at which most of the iron is in the form of sponge. My method eliminates the necessity for close time and temperature control over the reducing step, thus permitting a wider variety of reducing conditions, with a consequent decrease in time for the actual reducing operation.

Another feature of my invention resides in the recovery of ammonium carbonate leach solution. I have found that while nickel ammonium carbonate complex is soluble at certain conditions of temperature and superatmospheric pressure, and under a minimum partial pressure of ammonia gas, thus rendering it separable from precipitated iron, there are specific conditions of temperature and pressure at which a nickel salt will be precipitated. As the temperature at which the nickel salt will precipitate is one which it is quite practicable to attain, this fact points to the step of removing nickel from solution after previously having separated nickel in solution from the iron. The subsequent nickel-poor solution, containing regenerated ammonium hydroxide and ammonium carbonate, can again be used for the leaching of a fresh batch of reduced ore.

One example of effecting separation of nickel values from the iron ore by use of high temperature and pressure is given below, and is illustrative of my process.

An iron ore containing 1.48% nickel and greater than 0.10% cobalt, was reduced with pure hydrogen at approximately 1400° F., so that any nickel and cobalt compounds present were reduced to the metallic state. During the reducing step, iron, originally present in the ore as ferric oxide, was also reduced.

Depending on the degree of reduction, as has been explained, iron may now be present in reduced state in one of several forms. The simplest reduction would produce iron essentially as ferrous-ferric oxide (magnetite) and possibly containing some wüstite. A more severe reduction would result in some magnetite, wüstite, and some metallic iron being formed.

In this particular case, metallic iron, after reduction, was in excess of 75% of the total iron. The reduced ore was mixed with ammonium carbonate leach solution to form a slurry, and was then ready for the autoclave-leach treatment. The slurry, along with more leach solution, said solution containing approximately 18% ammonium carbonate, 0.02% sodium cyanide and 9% ammonia (NH$_3$) dissolved therein, was introduced into an autoclave and autoclave-leached at 300° F. for two hours. Prior to heating the autoclave, ammonia gas and oxygen were bled into the closed system, raising the total pressure to 200 p. s. i. As the autoclave temperature was raised to an ultimate of 300° F., the total pressure increased to 650 p. s. i. at the maintained temperature. During the leaching process the metallic nickel reacted with ammonium carbonate to form a nickel ammonium carbonate complex which remained in solution at the particular temperature and pressures used. After autoclaving, the slurry was removed to a thickener. The hydrated iron compounds formed during the autoclave-leach, took the form of a partially hydrated ferric oxide which has rapid filtering and settling characteristics.

This latter fact aids in separating iron from the nickel in solution during the filtration step which follows the thickener operation, and gives an important advantage over atmospheric leaching.

The pressures and temperatures employed during this autoclaving operation may vary considerably but they must be such as hold the nickel in solution. Preferably, the pressure should be at least 175 lb. per square inch, and the temperature should be at least 250° F.

The residue recovered by filtration was washed, first with ammonium carbonate solution and then with water.

At this point the primary purpose of the invention has been accomplished, that of separating nickel values from the iron so that any nickel values remaining in the iron are of such low order of magnitude that the iron oxide may be used successfully in the manufacture of pig iron.

The iron oxide residue from one sample of ore, treated by the process given in the foregoing description, analyzed as follows:

| | Percent |
|---|---|
| Fe | 53.0 |
| Ni | 0.05 |
| Co | 0.03 |
| Cr | 1.23 |
| Mn | 0.84 |
| Al$_2$O$_3$ | 7.20 |
| SiO$_2$ | 8.00 |

The above analysis shows that nickel and cobalt were eliminated from the ore to a point where they are no longer a problem in iron smelting operations.

Chromium and aluminum can be separated from the iron by well known methods.

While the nickel values, in the above example, were soluble in the aqueous solution during the autoclaving step at 300° F., and at the pressure given, and remained so upon cooling the slurry after autoclaving, which fact enabled me to separate the solution from the iron residue by filtration, I was able, by reintroducing the filtrate to an autoclave, and heating for two hours at a temperature just above 400° F., with consequent increase of pressure, but in the absence of added ammonia gas, to precipitate the nickel values, possibly as nickel carbonate, and thus recover them from the leach solution by a further filtration step. The filtrate from this second filtering operation contained substantially pure ammonium carbonate leach solution which can be returned to the original autoclave-leach operation.

Thus, by using two autoclaves, one for leaching and the other for recovering nickel values, I am able to maintain a closed circuit whereby there is little or no loss in ammonium carbonate leaching solution.

Apparently the solubility of nickel in the ammonium carbonate solutions under pressure is related to the partial pressure of ammonia gas. When sufficient ammonia gas is introduced into the autoclave at the outset, the temperature can be raised to 300° F., or 400° F., and nickel will remain in solution. However, when, as mentioned above, no ammonia gas is introduced into the autoclave, nickel will be precipitated when the temperature is raised to 400° F.

In the practice described above, most of the nickel is dissolved during the autoclaving operation, as the mixture of ore and reagent go directly into the autoclave. This is my preferred practice. However, the process may be modified by first making the slurry of ore and reagent and permitting a portion of the nickel to be dissolved at atmospheric pressures and then autoclaving the mixture. It is essential in both the preferred practice and in the modification just described that the autoclaving operation be performed upon the mixtures of ore, reagent and solution, as the autoclaving at high temperatures and pressures not only increases the amount of nickel dissolved from the ore but facilitates the removal of solution from the insoluble portion of the ore following the autoclaving treatment.

While the figures given in the herein described examples for time, temperature and pressure are eminently satisfactory for the particular cases described, it should be explained that my invention can be performed under a wide range of operating conditions. Due to the fact that alteration of any one of the following conditions, viz., time, temperature, pressure, concentration of solution, amount of recirculation, and partial pressure of ammonia gas and oxygen gas, may affect the conditions of time, temperature and/or pressure required to maintain nickel values in solution during autoclaving, it is evident that the range of operating characteristics necessary for each and every given condition must remain empirical in nature. While the many variables which may be introduced during the autoclave-leach operation necessitate an indefiniteness as to maximum and minimum operating conditions to meet all situations, such indefiniteness of conditions in no way detracts from the fundamental concept and advance in the art provided by my invention. It is likewise true, when autoclaving a nickel carbonate solution to precipitate nickel salt, that the optimum conditions for time, temperature and pressure may vary as the concentration of the solution varies.

I claim:

1. A method of treating a ferrous ore containing nickel in excess of 0.25 per cent to remove nickel therefrom, which comprises reducing said ore to a point at which substantially all of the nickel has been reduced to elemental metal, then treating said ore in the presence of an aqueous ammonium carbonate solution and ammonia gas at a pressure of at least 175 pounds per square inch and at a temperature of at least 250° F.

2. A method of treating a ferrous ore containing nickel in excess of 0.25 per cent to remove nickel therefrom, which comprises reducing said ore to a point at which substantially all of the nickel has been reduced to elemental metal, forming a slurry with said ore and treating said slurry in the presence of ammonium carbonate and ammonia gas at a temperature at least 250° F. and at a pressure of at least 175 pounds per square inch for at least 30 minutes.

3. A method of treating a ferrous ore containing nickel in excess of 0.25 per cent to remove nickel therefrom, which comprises reducing said ore to a point at which substantially all of the nickel has been reduced to elemental metal, forming a slurry with said ore and treating said slurry in the presence of an aqueous ammonium carbonate solution and ammonia gas at a pressure of at least 175 lbs. per square inch and at a temperature of at least 250° F., separating the nickel bearing solution from said treated slurry and heating the solution at higher pressures and temperatures than in the previous treatment and in the absence of added ammonia gas to separate nickel compounds from said solution.

4. A method of treating a ferrous ore containing nickel in excess of 0.25 per cent to remove nickel therefrom, which comprises reducing said ore to a point at which substantially all of the nickel and at least some of the iron has been reduced to elemental metal, forming a slurry with said ore and treating said slurry in the presence of an aqueous ammonium carbonate solution and ammonia gas at a pressure of at least 175 lbs. per square inch and at a temperature of at least 250° F., separating the nickel bearing solution from said treated slurry and heating the solution at higher pressures and temperatures than in the previous treatment and in the absence of added ammonia gas to separate nickel compounds from said solution.

References Cited in the file of this patent

UNITED STATES PATENTS 2,531,336  Hills et al. -------------- Nov. 21, 1950